United States Patent
Park et al.

(10) Patent No.: US 7,766,200 B2
(45) Date of Patent: Aug. 3, 2010

(54) CROSS BAR LOCKING DEVICE OF ROOF CARRIER FOR VEHICLES

(75) Inventors: Byung-Hwa Park, Daejeon (KR); Hee-Deog Kim, Seoul (KR)

(73) Assignee: LG Chem, Ltd. (KR)

( * ) Notice: Subject to any disclaimer, the term of this patent is extended or adjusted under 35 U.S.C. 154(b) by 283 days.

(21) Appl. No.: 11/938,025

(22) Filed: Nov. 9, 2007

(65) Prior Publication Data
US 2008/0116237 A1 May 22, 2008

(30) Foreign Application Priority Data
Nov. 9, 2006 (KR) .................. 10-2006-0110610

(51) Int. Cl.
*B60R 9/00* (2006.01)
*B60R 9/04* (2006.01)
*B60R 9/045* (2006.01)
(52) U.S. Cl. ............... 224/315; 224/321; 224/322; 224/324; 224/325; 224/330; 224/331

(58) Field of Classification Search ............... 224/315, 224/321, 322, 325, 326, 329–331; 410/137–139, 410/144, 149, 150, 152; 403/DIG. 8
See application file for complete search history.

(56) References Cited

U.S. PATENT DOCUMENTS 6,131,782 A * 10/2000 De Silva et al. ............. 224/321
2003/0066852 A1* 4/2003 Aftanas et al. ............. 224/321

* cited by examiner

*Primary Examiner*—Nathan J Newhouse
*Assistant Examiner*—Adam Waggenspack
(74) *Attorney, Agent, or Firm*—Cantor Colburn LLP

(57) ABSTRACT

Disclosed herein is a cross bar locking device of a roof carrier for a vehicle. The cross bar locking device includes a link, which is movably provided in the cross bar and has protrusion pins, and locking members, which are coupled to respective ends of the link so as to be axially movable. The locking member has a locking protrusion, to be locked to the corresponding locking hole of the associated side rail, and a plurality of protrusion pins. The cross bar locking device further includes levers, which are rotatably coupled to respective ends of the cross bar by a hinge. An operating slot is formed in each lever so that the protrusion pins of the corresponding locking member and the link are inserted into the operating slot. Movement guide slots are formed in the lever and communicate with the operating slot.

7 Claims, 4 Drawing Sheets

CROSS BAR LOCKING DEVICE OF ROOF CARRIER FOR VEHICLES

This application claims the benefit of the filing date of Korean Patent Application No. 10-2006-0110610 filed on Nov. 9, 2006 in the Korean intellectual Property Office, the disclosure of which is incorporated herein its entirety by reference.

BACKGROUND OF THE INVENTION

1. Field of the Invention

The present invention relates generally to cross bar locking devices of roof carriers for vehicles and, more particularly, to a cross bar locking device of a roof carrier for vehicles which is constructed such that a cross bar is easily locked to and released from side rails of the roof carrier.

2. Description of the Related Art

As is well known to those skilled in the art, roof carriers are provided on roof panels of vehicles for loading leisure sports equipment and other cargo thereon, thus solving the problem of small interior cargo space defined in the vehicles.

Such a roof carrier includes side rails, which are provided on opposite sides of a roof panel of a vehicle and are oriented in the longitudinal direction of the vehicle, and cross bars, which are provided in directions that cross the side bars. The cross bars are slidable along the side rails such that the positions of the cross bars can be adjusted to correspond to the size of the load.

In detail, as shown in FIG. 1, a roof carrier 10 is provided on the upper surface of a roof panel 2 of a vehicle.

The roof carrier 10 includes side rails 20, which are provided on opposite sides of the upper surface of the roof panel 2 of the vehicle in the longitudinal direction of the vehicle, and cross bars 30, which are coupled at opposite ends thereof to the side bars 20 in the lateral direction of the vehicle.

Furthermore, the cross bars 30 are slidable along the side rails 20 such that the distance therebetween can be adjusted to correspond to the size of the load. The opposite ends of each cross bar 30 are locked to or released from the side rails 20 using locking devices 40.

The locking devices 40 are provided on the respective opposite ends of each cross bar 30, and each locking device 40 is individually operated and is locked to or released from the corresponding side rail 20.

However, in the conventional art, because the locking devices 40 of the roof carrier 10, which are provided on respective opposite ends of the cross bar 30 to lock or release the cross bar 30 to or from the side rails 20, are individually operated, it is very inconvenient for a user to adjust the position of the cross bar 30.

In detail, to adjust the position of the cross bar 30, the user must unlock one locking device 40 and, thereafter, go around the vehicle to the opposite position and unlock the remaining locking device 40. When it is desired to lock the cross bar 30 to the side rails 20, the user must also conduct the locking operation from both sides of the vehicle.

SUMMARY OF THE INVENTION

Accordingly, the present invention has been made keeping in mind the above problems occurring in the prior art, and an object of the present invention is to provide a cross bar locking device of a roof carrier for vehicles in which a cross bar of the roof carrier can be locked to or released from respective side rails by manipulating only one cross bar locking device, so that the position of the cross bar can be easily adjusted.

In order to accomplish the above object, the present invention provides a cross bar locking device of a roof carrier for a vehicle, the roof carrier including: side rails provided on opposite sides of a roof panel of the vehicle, each of the side rails having a plurality of locking holes; a cross bar movably coupled between the side rails; and the cross bar locking device to lock or release the cross bar to or from the side rails, wherein the cross bar locking device includes: a link movably provided in the cross bar and having a plurality of protrusion pins; a plurality of locking members coupled to respective opposite ends of the link so as to be movable in an axial direction of the link, each of the locking members having a locking protrusion, to be locked to the corresponding locking hole of the associated side rail, and a plurality of protrusion pins; and a plurality of levers rotatably coupled to respective opposite ends of the cross bar by respective hinges, with an operating slot formed in each of the levers so that the protrusion pins of the corresponding locking member and the link are inserted into and guided by the operating slot, and a plurality of movement guide slots formed in each of the levers and communicating with the operating slot such that the protrusion pins are inserted into the respective movement guide slots, wherein, when one lever is rotated around the hinge with respect to the cross bar, the locking members are moved in an axial direction of the link and are thus locked to or released from the respective side rails.

Preferably, each of the operating slots has an elliptical shape, and a length of each of the movement guide slots is equal to or greater than a length difference between a major axis and a minor axis of the operating slot.

Furthermore, an elastic member is provided between the link and each of the locking members to elastically support the link and the locking member.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings.

FIGS. 2 through 6 are views illustrating a cross bar locking device of a roof carrier for vehicles according to the embodiment of the present invention.

Figure 1:
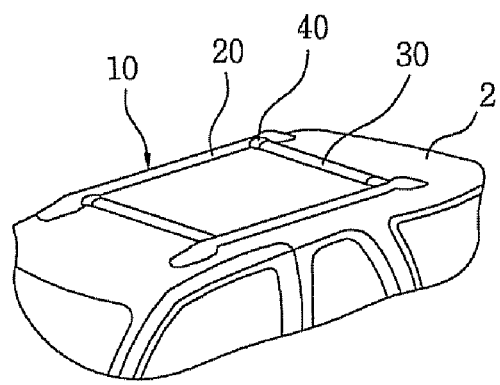
FIG. 1 is a schematic view showing a conventional roof carrier for vehicles.
Figure 2:
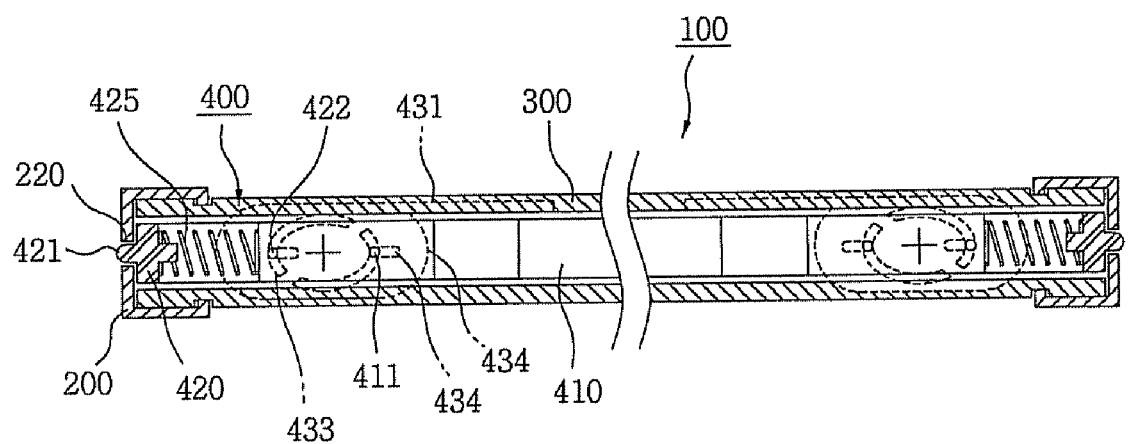
FIG. 2 is a sectional view of a cross bar locking device of a roof carrier, according to an embodiment of the present invention.

As shown in FIG. 2, the roof carrier 100 for a vehicle according to the present invention includes side rails 200, which are provided on opposite sides of the upper surface of a roof panel 2 of the vehicle in the longitudinal direction of the vehicle, and cross bars 300, which are slidably provided between the side bars 20 in the lateral direction of the vehicle.

The surfaces of the side rails 200 that face each other are open. Guide protrusions 210, which protrude in directions facing each other, are provided on respective upper and lower edges of the open surface of each side rail 200. Several locking holes 220 are formed in the surface of the side rail 200 opposite the open surface thereof at positions spaced apart from each other at regular intervals.

Meanwhile, opposite ends of each cross bar 300 are slidably inserted into the respective side rails 200. Guide grooves 310, into which the guide protrusions 210 of the corresponding side rail 200 are inserted, are formed in each of the opposite ends of the cross bar 300. In addition, an opening 320 for the installation of a lever 430, which will be explained later herein, is formed in the cross bar 300 at a position adjacent to the guide grooves 310.

Here, the cross bar 300 may be made of a hollow rectangular pipe or, alternatively, a rectangular pipe, which has a U-shaped cross-section and is open on one surface thereof.

Locking devices 400, which releasably lock the corresponding cross bar 300 to the side rails 200, are provided in the respective opposite ends of each cross bar 300 coupled to the side rails 200.

Figure 3:
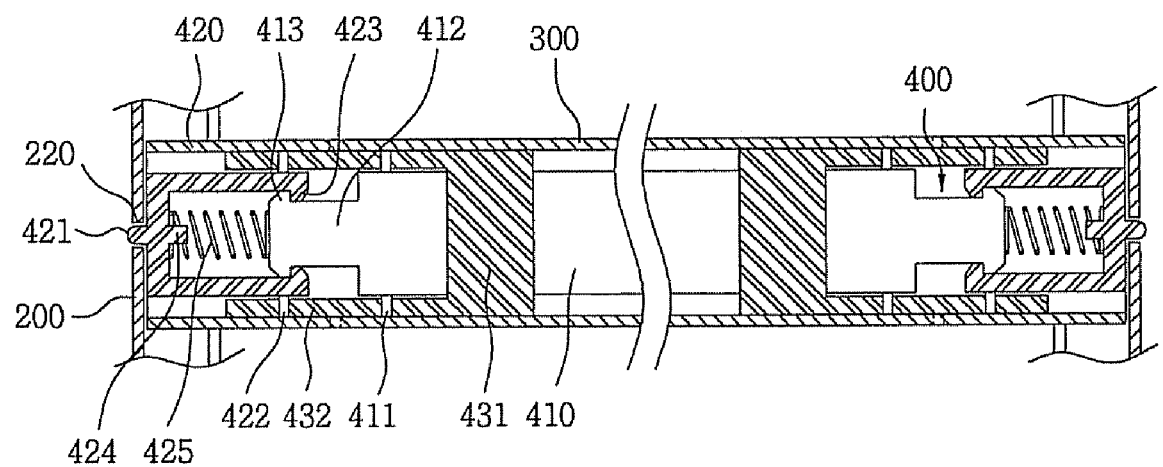
FIG. 3 is a plan sectional view illustrating the coupling structure between a link, a locking member and a lever of the cross bar locking device according to the present invention.

As shown in FIGS. 2 and 3, each locking device 400 includes a link 410, a locking member 420 and a lever 430.

The link 410 is movably installed in the cross bar 300. Protrusion pins 411 are provided on opposite surfaces of each of the opposite ends of the link 410.

Furthermore, as shown in FIG. 3, a locking part 412, which has a diameter smaller than that of the link 410, axially extends from each end of the link 410. Locking stops 413 are provided on opposite surfaces of the end of the locking part 412.

The locking member 420 is installed in each end of the cross bar 300, and is coupled to each locking part 412 of the link 410 so as to be movable in an axial direction.

The locking member 420 has an approximately U-shaped cross-section, which is open at the end facing the corresponding locking part 412. Stop protrusions 423, which are locked to the respective locking stops 413 of the locking part 412, are provided on respective opposite edges of the open end of the locking member 420.

Furthermore, a locking protrusion 421, which is inserted into one locking hole 220 of the corresponding side rail 200, is provided at a predetermined position on each locking member 420. Protrusion pins 422, which have the same structure as the protrusion pins 411 of the link 410, are provided on the outer surface of respective opposite sidewalls of the locking member 420.

In addition, an elastic member 425 for providing returning force is provided between each locking part 412 of the link 410 and the corresponding locking member 420, and thus elastically supports the link 410 and the locking member 420. An end of the elastic member 425 is securely fitted over a support protrusion 424, which is provided on the inner surface of the locking member 420.

Figure 4:
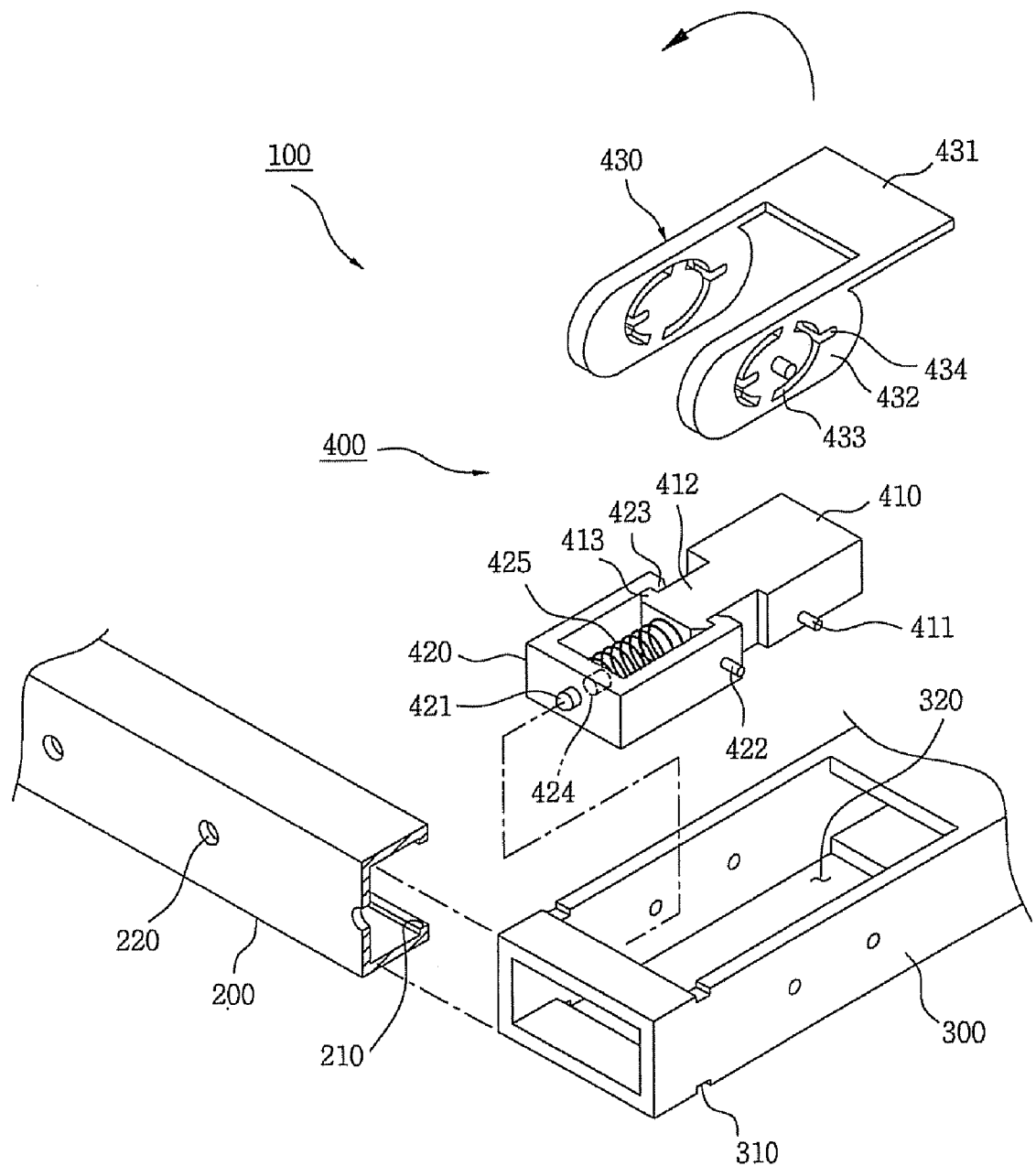
FIG. 4 is a view illustrating the coupling structure between the lever and a cross bar according to the present invention.

Meanwhile, as shown in FIG. 4, the lever 430 includes a handle 431, which has a plate shape corresponding to the opening 320 of the cross bar 300, and operating plates 432, which are integrally provided on respective opposite ends of the rear edge of the handle 431 and are spaced apart from each other by a predetermined distance, and each of which has an elliptical shape.

The operating plates 432 of the lever 430 are rotatably coupled to the inner surfaces of the respective sidewalls of each end of the cross bar 300. Thus, the lever 430 can be easily rotated with respect to the cross bar 300 through the opening 320 of the cross bar 300 without being impeded by the other parts.

Furthermore, operating slots 433, which form an elliptical shape, and into which corresponding protrusion pins 411 and 422 of the link 410 and the locking member 420 are respectively inserted, are formed in each operating plate 430. Movement guide slots 434, which communicate with the respective operating slots 433, are formed in the operating plate 430 along the major axis of the elliptical shape defined by the operating slots 433.

Therefore, when the lever 430 is in the normal state, the protrusion pins 411 and 422 of the link 410 and the locking member 420 are disposed in the respective operating slots 433 at positions corresponding to the major axis thereof. When the lever 430 is rotated, the protrusion pins 411 and 422 of the link 410 and the locking member 420 are moved in the respective operating slots 433 to positions corresponding to the minor axis of the elliptical shape, defined by the operating slots 433. Therefore, the link 410 and the locking member 420 are pulled in directions approaching each other, so that the locking member 420 is released from the corresponding side rail 200.

As such, when the link 410 and one locking member 420 (the leading locking member 420) are pulled towards each other, the other locking member 420 (the tailing locking member 420) is also pulled along with the link 410 towards the leading locking member 420. At this time, the protrusion pins 411 and 422, which are respectively provided on the tailing end of the link 410 and the tailing locking member 420, are moved along the respective movement guide slots 434 of the tailing lever 430, so that the tailing locking member 420 is released from the corresponding side rail 200.

Here, the operating slots 433 are formed such that the length difference between the major axis and the minor axis is greater than the length of the locking protrusion 421. Preferably, the length of each movement guide slot 434 is the same as or greater than the distance that the link 410 and the locking member 420 are moved, that is, the length difference between the major axis and the minor axis of the operating slots 433.

Although the lever 430 has been described as having several operating plates 432 in the embodiment of the present invention, the lever 430 may have only a single operating plate.

The operation of the cross bar locking device of the roof carrier for vehicles according to the present invention, having the above-mentioned construction, will be explained herein below.

The cross bars 300 of the roof carrier 100 maintain the state of being locked to the side rails 200 by the locking devices 400 in the normal state, that is, before a user manipulates the cross bars 300.

In detail, as shown in FIG. 2, the cross bars 300 are locked to the side rails 200 by the locking protrusions 421 of the locking members 420, inserted into and locked to the respective locking holes 220 of the side rails 200.

Figure 5:
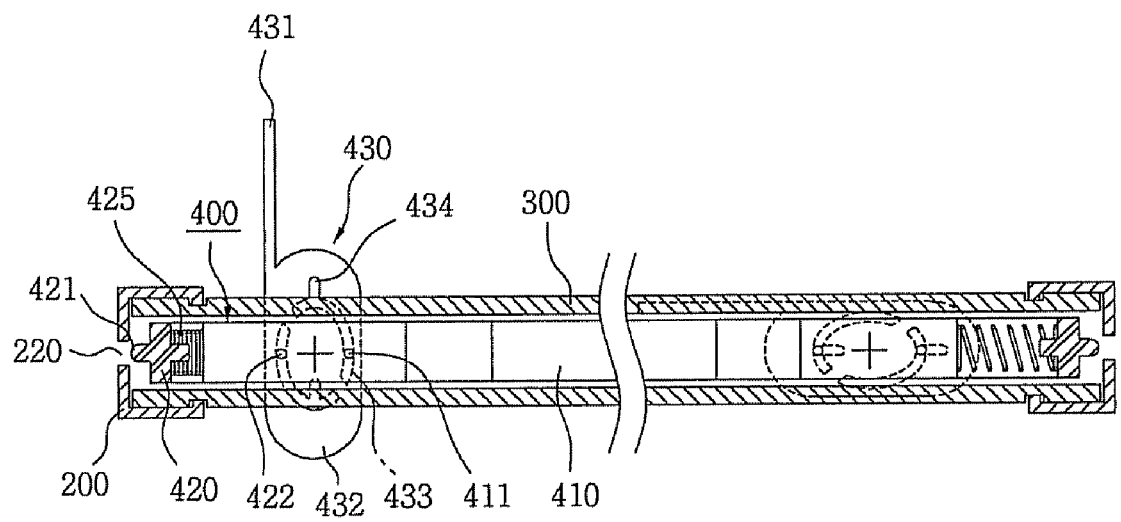
FIG. 5 is a view showing the operation of the cross bar locking device according to the present invention.
Figure 6:
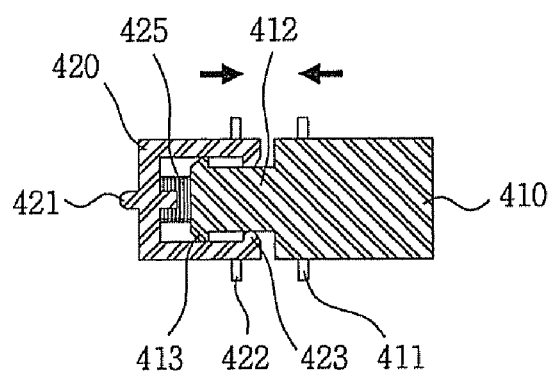
FIG. 6 is a plan sectional view showing the operation of the link and the locking member when the cross bar locking device is operated according to the present invention.

In this state, to adjust the position of the cross bar 300 depending on the size of the load, the user holds the handle 431 of one lever 430 through the corresponding opening 320 of the cross bar 300 and pulls and rotates it upwards, as shown in FIG. 5.

Then, the protrusion pins 411 and 422 of the link 410 and the locking member 420, which have been disposed at the major axial positions of the operating slots 433, are moved to the minor axial positions of the operating slots 433 by the rotation of the lever 430. The link 410 and the locking member 420 are pulled towards each other while compressing the elastic member 425 interposed therebetween.

At this time, the protrusion pins 411 provided on the tailing end of the link 410 are horizontally moved along the corresponding movement guide slots 434 of the tailing lever 430. Furthermore, the tailing locking member 420 is also moved along with the lever 410 by the movement of the link 410. At this time, also, the protrusion pins 422 of the tailing locking member 420 are horizontally moved along the corresponding movement guide slots 434 of the tailing lever 430.

Here, the distance that each locking member 420 is moved in the above-mentioned manner is greater than the length of each locking protrusion 421, which has been locked to the corresponding locking hole 220 of the associated side rail 200. Thus, the locking members 420 are released from the respective side rails 200, so that the cross bar 300 enters the state in which the position thereof is adjustable.

As such, the opposite locking devices 400 can be simultaneously released from the respective side rails 200 by manipulating the lever 430 of only one locking device 400, so that the position of the cross bar 300 can be easily adjusted.

Meanwhile, to lock the cross bar 300, the position of which has been adjusted, to the side rails 200 again, the user rotates the lever 430 in a reverse direction.

Then, the protrusion pins 411 and 422, which have been disposed at the minor axial positions of the operating slots 433, are moved to the major axial positions of the operating slots 433 by the rotation of the lever 430. Simultaneously, the link 410 and the leading locking member 420, which have been pulled towards each other, are moved away from each other by the returning force of the elastic member 425 that was compressed therebetween.

Therefore, the locking protrusion 421 of the leading locking member 420, which is moved away from the link 410, is inserted into and locked to the corresponding locking hole 220 of the associated side rail 200. Simultaneously, the locking member 420 of the tailing locking device 400 is also moved to the associated side rail 200 both by the link 410, which is being moved away from the leading locking member 420, and by the returning force of the elastic member 425. Thus, the locking protrusion 421 of the tailing locking member 420 is also inserted into and locked to the corresponding locking hole 220.

As such, the opposite locking devices 400 can be easily and simultaneously locked to the respective side rails 200 by manipulation of only one locking device 400.

As described above, a cross bar locking device of a roof carrier for vehicles according to the present invention has an advantage in that a cross bar of the roof carrier can be locked to or released from respective side rails by manipulation of only one cross bar locking device, so that the position of the cross bar can be easily adjusted.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A cross bar locking device of a roof carrier for a vehicle including side rails provided on opposite sides of a roof panel of the vehicle, each of which has a plurality of locking holes, a cross bar movably coupled between the side rails, and the cross bar locking device to lock or release the cross bar to or from the side rails, the cross bar locking device comprising:
   a link movably installed in the cross bar and having a plurality of protrusion pins;
   a locking member coupled to each opposite end of the link to be movable in an axial direction of the link, each of the locking members having a plurality of protrusion pins and a locking protrusion to be inserted into the corresponding locking hole of the associated side rail; and
   a lever rotatably coupled to each opposite end of the cross bar by a corresponding hinge with an operating slot formed in each of the levers so that the protrusion pins of the corresponding locking member and the link are inserted into and guided by the operating slot and with a plurality of movement guide slots formed in each of the levers and which communicates with the operating slot such that the protrusion pins are inserted into the respective movement guide slots,
   wherein, when the lever is rotated around the corresponding hinge with respect to the cross bar, the locking members are moved in an axial direction of the link and are thus locked to or released from the respective side rails.

2. The cross bar locking device of the roof carrier for the vehicle according to claim 1, wherein each of the operating slots has an elliptical shape.

3. The cross bar locking device of the roof carrier for the vehicle according to claim 2, wherein a length of each of the movement guide slots is equal to or greater than the difference in length between a major axis and a minor axis of the operating slot.

4. The cross bar locking device of the roof carrier for the vehicle according to claim 1, wherein an elastic member is fixed at the link or the locking member, and is provided between the link and each of the locking members to elastically support the link and the locking member.

5. The cross bar locking device of the roof carrier for the vehicle according to claim 2, wherein an elastic member is fixed at the link or the locking member, and is provided between the link and each of the locking members to elastically support the link and the locking member.

6. The cross bar locking device of the roof carrier for the vehicle according to claim 3, wherein an elastic member is fixed at the link or the locking member, and is provided between the link and each of the locking members to elastically support the link and the locking member.

7. The cross bar locking device of the roof carrier for the vehicle according to claim 1, wherein
   a guide protrusion is provided on corresponding upper and lower edges of the open surface of each side rail, and
   a guide groove into which the guide protrusion is inserted is formed in the each opposite end of the cross bar.

* * * * *